US007395350B1

(12) United States Patent
de Caluwe et al.

(10) Patent No.: US 7,395,350 B1
(45) Date of Patent: Jul. 1, 2008

(54) CONTROL SYSTEM FOR AN IC NETWORK

(75) Inventors: Franciscus Elisabeth de Caluwe, Amsterdam (NL); Michael Robert Schenk, Zoetermeer (NL); Declan Joseph Doyle, Greystones County Wicklow (IE); Albert Garlich, Zoetermeer (NL); Marc Gerard Daniel Steen, Amsterdam (NL); Aurelia Kloosterhof, The Hague (NL)

(73) Assignee: Koninklijke KPN N.V., The Hague (NL)

(*) Notice: Subject to any disclaimer, the term of this patent is extended or adjusted under 35 U.S.C. 154(b) by 0 days.

(21) Appl. No.: 09/958,133

(22) PCT Filed: Apr. 13, 2000

(86) PCT No.: PCT/EP00/03337

§ 371 (c)(1), (2), (4) Date: Nov. 15, 2001

(87) PCT Pub. No.: WO00/64108

PCT Pub. Date: Oct. 26, 2000

(30) Foreign Application Priority Data

Apr. 14, 1999 (NL) .................................... 1011788

(51) Int. Cl.

*G06F 15/173* (2006.01)
*G06F 15/16* (2006.01)
*H04J 1/16* (2006.01)
*H04J 3/14* (2006.01)
*H04L 1/00* (2006.01)

(52) U.S. Cl. ....................... 709/242; 709/224; 709/232; 370/235

(58) Field of Classification Search .............. 370/395.2, 370/395.21, 229–231, 235; 455/452.2; 709/224, 709/223, 226, 235, 242, 232
See application file for complete search history.

(56) References Cited

U.S. PATENT DOCUMENTS 5,673,253 A * 9/1997 Shaffer ....................... 370/229

(Continued)

FOREIGN PATENT DOCUMENTS

EP 0848560 A2 * 6/1998
WO WO 98/58474 12/1998

OTHER PUBLICATIONS

H. Brander et al, "Quality of Service in Broadband Communications", Proceedings of the International Conference on Integrated Broadband Services and Networks, Oct. 15-18, 1990, cover page and pp. 166-171.

(Continued)

*Primary Examiner*—Glenton B. Burgess
*Assistant Examiner*—Philip J Chea
(74) *Attorney, Agent, or Firm*—Michaelson & Associates; Petter L. Michaelson

(57) ABSTRACT

Control system for a communications network, wherein the control system contains network-control means and information-processing means. Through the quality-control means, a user may set a desired quality (UQS). Additionally, the quality-control means measures quality delivered (UQS') by the information-processing means and compares the two qualities, UQS and UQS'. By reference to a calculated comparison result, parameters are passed on to the network-control means in order to minimize a difference between the desired and delivered qualities. The quality-control means may comprise one or more user agents which may be set through the information-processing means and the communications network.

9 Claims, 1 Drawing Sheet

6
3
2
1
3
5
4
7
$7_5$ AGENT
$7_6$ AGENT

U.S. PATENT DOCUMENTS 5,689,800 A * 11/1997 Downs ........................ 725/114
5,819,043 A * 10/1998 Baugher et al. ............. 709/222
5,881,050 A * 3/1999 Chevalier et al. ........... 370/230
5,884,037 A * 3/1999 Aras et al. .................. 709/226
6,021,439 A * 2/2000 Turek et al. ................. 709/224
6,023,453 A * 2/2000 Ruutu et al. ................ 370/229
6,041,039 A * 3/2000 Kilkki et al. ................ 370/230
6,065,137 A * 5/2000 Dunsmore et al. ............ 714/37
6,078,953 A * 6/2000 Vaid et al. ................... 709/223
6,088,732 A * 7/2000 Smith et al. ................. 709/229
6,101,549 A * 8/2000 Baugher et al. ............. 709/238
6,347,091 B1 * 2/2002 Wallentin et al. ........... 370/437
6,745,221 B1 * 6/2004 Ronca ........................ 718/104
2002/0059627 A1 * 5/2002 Islam et al. ................... 725/96
2004/0179515 A1 * 9/2004 Kamani et al. .............. 370/352

OTHER PUBLICATIONS

J. Dospisil et al, "Multiagent Testbed For Measuring Multimedia Presentation Quality Disorders", Proceedings of International Conference on Multi-Media Education, Jul. 1996, pp. 175-184.

* cited by examiner

CONTROL SYSTEM FOR AN IC NETWORK

BACKGROUND OF THE INVENTION

1. Field of the Invention

The invention relates to a control system for a communications network.

2. Description of the Prior Art

Advanced telecommunications networks are bearer oriented. A telecom operator does not know for which applications customers are using the communications network.

In this case and in the description below, "applications" implies the whole of hardware (PCs etc.) and software (control and application software) which customers are using for, e.g., Internet browsing, e-mail, video meetings etc.

The customer has an opinion on the quality of the application making use of the bearer (the network), not on the quality of the bearer itself. From the operator, however, it is expected that he will provide sufficient Technical Quality of Service (QoS) to the customer.

The present invention relates to a system for determining the minimum required technical QoS (TQS) in the network (bearer) on the basis of the "User-perceived" QoS (UQS) desired by the customer.

Several mechanisms for providing TQS guarantees in a network are generally known. Frequently, guarantees are provided on TQS parameters, such as "bit error rate", "packet loss", "throughput bit rate" and "delay". In addition, various mechanisms are known for measuring UQS, e.g., for transmission chains comprising speech or video coders and decoders. The known systems, however, have the drawback that any coupling between the TQS guarantees (operator) and the UQS wishes (customer) is lacking.

That coupling is hard to make and, in addition, depends on the terminal and the wishes of the customer. The customer eventually observes a quality which for the major part is determined by the terminal. If there are problems with the quality, the operator is often (unjustly) blamed. The customer just wants to get "value for his money" or, in other words, a maximum overall quality-price ratio.

SUMMARY OF THE INVENTION

The invention provides for a system, with which the quality desired by the user (UQS) may be set and maintained by measuring the quality delivered (UQS') as observed by the customer, and by comparing the two, UQS and UQS', with one another and by computing, from the comparison result, minimum TQS requirements for the network. Since here it concerns the settings effected by a user on the one hand, and the quality "experienced" by the user (to be measured by the system), for the execution of all this there is preferably made use of one or more user agents, i.e., software modules which are capable, in several locations of the telecommunications network and information-processing systems associated therewith, "on behalf of the user", of observing and affecting specific processes. The user agent determines (computes), on the basis of the set preferences of the customer and the characteristics of the application on the one hand, the optimum settings for the application (possibly including control hardware and software) and, on the other hand, the optimum TQS parameters for the network, so that the resulting UQS and UQS' approximate the UQS, which is set by the customer as being desired, as well as possible. Since the system measures the quality delivered (realized) (UQS') and the quality desired (UQS), it will be able—provided the system is aware of the characteristic properties of the application—to determine the most efficient network settings (TQS). The application characteristics are derived by the system—in this case the user agent—from the application. The user agents are set, from the information-processing systems, by setting software. This setting software is preferably constructed as a plug-in of the application applied by the user, e.g., a plug-in of the video-conferencing software applied by the user.

Finally, it should be noted that, the user agents may be provided with artificial-intelligence capabilities, as a result of which they need not accurately know in which way exactly the image, sound etc. presented to the users improves or deteriorates, but where the agents discover this in an iterative trial-and-error process and thus learn the setting rules for the application themselves.

By applying the invention, the operator may focus on the realization of the TQS parameters requested by way of the user agent, and is no longer held liable for unjust UQS requirements which are the result of the applications for which the user is responsible.

It is noted that some related methods are known:

Brander, H. et al. "Quality of Service In Broadband Communications" describes the difference between user perceived quality and actual network quality. This difference is essential to the invention but is not part of the present invention itself. The present invention itself is the ability to automatically compute actual network quality settings based on previous and current user perceived quality parameters and then have the network implement these settings. The concept according to the invention is not disclosed.

Dospisil J. et al. "Multiagent testbed for measuring multimedia presentation quality disorders" describes the possibility of measuring user perceived performance parameters based on network settings and mentions the possibility of actively controlling the network to change network settings and bring them in line with the user-requested quality.

WO9858474 (Ericsson) discloses a system to control quality settings in a network. It does not however address the possibility of relating user perceived quality parameters to network quality settings.

BRIEF DESCRIPTION OF THE DRAWINGS

The invention will be further explained in the following, on the basis of an exemplary embodiment, with reference to the drawing. In the drawing.

DETAILED DESCRIPTION OF THE INVENTION

Figure 1:
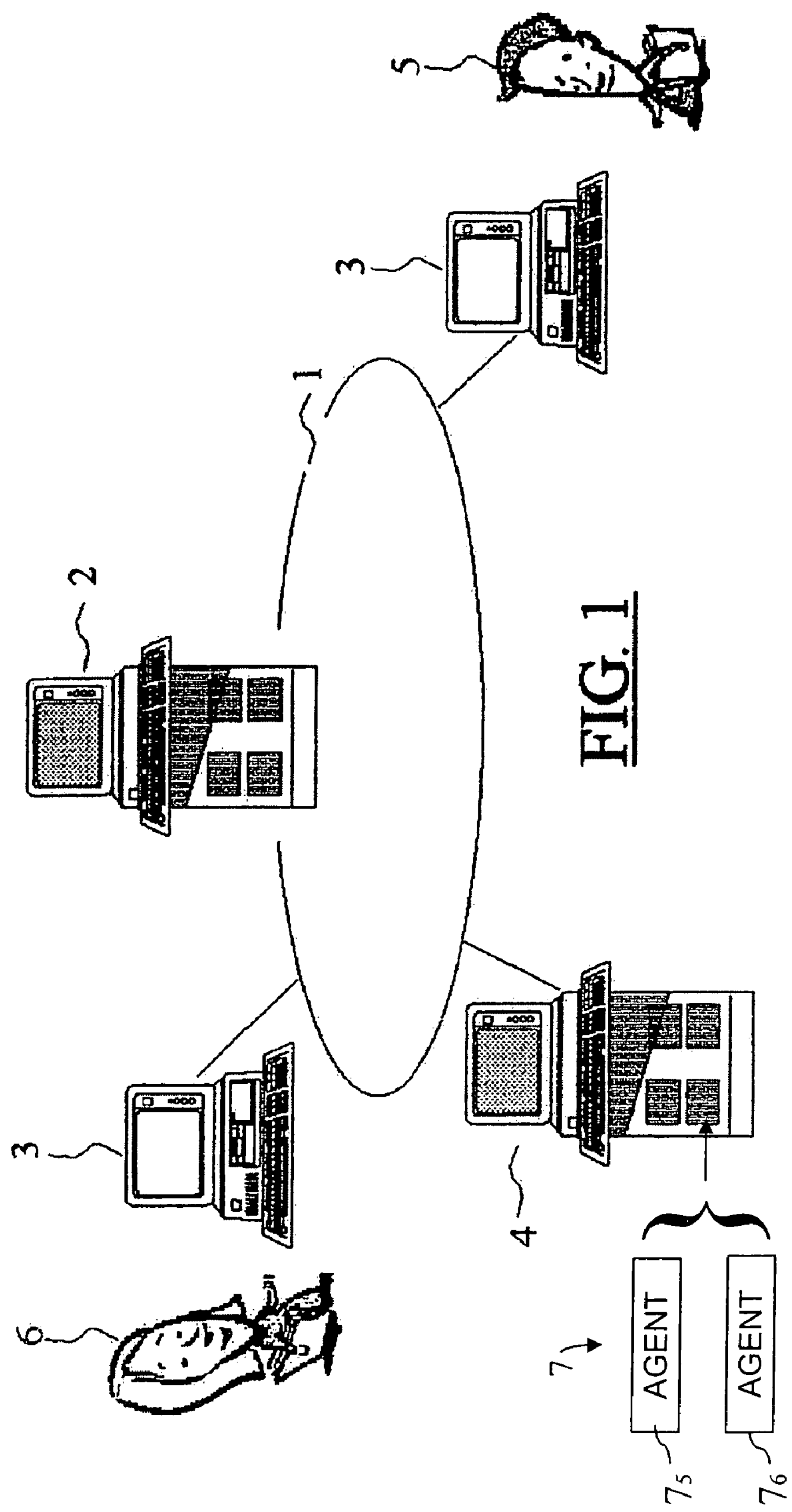
FIG. 1 shows a communications network run by a network operator, controlled by a network-control server.

The operation of the invention is further explained by reference to the accompanying FIG. 1. FIG. 1 shows a communications network 1 run by a network operator, controlled by a network-control server 2 (typically, large networks are controlled by a large number of control servers which are coupled to the network and to one another by way of a control or signaling network).

To the network 1, there are connected application terminals 3 having users 5 and 6, respectively, who may enter into connection with one another in order to exchange—under the control of application modules activated within said terminals 3—with one another, e.g., for the benefit of an IP video-conferencing session. In this connection, the (technical) QoS, TQS is controlled by the control server 2. In this exemplary implementation, there is additionally connected, to the network 1, a UQS server 4. The UQS server co-operates with both the network server 2 and the user terminals 3, i.e., with the applications active thereon. It is proposed that all signals between the drawn components 2 . . . 4 be exchanged by way of the network 1 using, e.g., the Internet Protocol (=IP); by the way, other protocols are imaginable as well. On the UQS server 4, a user-agent platform 7 (agent software) is active, comprising a user agent, specifically agents $7_5$ and $7_6$, respectively, of each of the users 5 and 6. Each agent 7 within the server 4 may be set by his or her user, as the case may be, by way of his/her terminal, with an agent-setting application active thereon, which may possibly be implemented as a subapplication—e.g., a plug-in—of the terminal application. By way of the network, the settings desired by the users 5 and 6 are thus passed on to their agents on the server 4, relating to, e.g., a video conference having, e.g., high-quality video images, including stereo hi-fi sound. Either initiated by the agents or by the terminal applications, the characteristic properties of those applications are passed on to the agents, as well as a number of variables which together serve as a measurement signal which is characteristic of the quality experienced by the users of, in this case, the video and audio signals. There are known algorithms which, by way of mathematical processing of the video and audio signals received, provide such measurement signals. During the exchange of the video and audio signals—encoded into digital signals—during the video-conferencing session, there are therefore continuously transmitted UQS measurement and control signals between the user applications active on the terminals 3 and the UQS server 4. The server 4 attempts to optimize the UQS by, on the one hand, modifying—if so required—the settings of the applications active on the terminals 3—whose characteristic properties server 4, after all, knows—and, on the other hand—once again, if required—by applying at the control server 2—once again by way of the network 1—for modification in the TQS allotted. The latter may imply the application for a higher TQS—which is typically more expensive—or rather the application for a lower—cheaper—TQS, namely, if the UQS desired by the users may be attained by a lower TQS, but a better, optimum setting of the application parameters and possibly the parameters of the control system of the terminal 3 (e.g., screen settings, transmission rate, IP settings).

Users will generally endeavor to minimize the communication costs. The user agents 7 on server 4 will therefore always attempt, in the event of simultaneous optimization of the setting of the parameters of the local applications, to make use of a minimum TQS, to be set by the network server 2 under control of the user agents within server 4. In addition, the agents may be instructed—by the users—that the TQS is not permitted to be higher than corresponds to a specific amount of money per time unit.

The invention claimed is:

1. A control system for a communications network for optimizing quality of service experienced by each one of a plurality of users through use of an associated one of a plurality of application terminals connected to the network, the control system comprising:

a network control server, connected to the network, for establishing a communication channel, through the network, having a predefined technical quality of service (TQS) associated therewith to be delivered by the channel and for subsequently changing the technical quality of service as requested by the terminal, the channel being for use by a specific application then provided to said each user through the associated application terminal thereby defining a plurality of corresponding specific applications for the users; and a quality-control server, connected to the network and responsive to information, provided by the associated application terminal through the network, the information reflecting both characteristic properties of the associated application terminal and operational settings of the specific application and also quality information, the quality information reflective of quality of service for the channel as requested by said each user (UQS) for use by the specific application and quality of service as actually delivered through the associated application terminal to the user (UQS'), wherein the quality-control server:

once the channel is established, compares values of the requested and delivered qualities of service to yield a difference there between, and optimizes, in response to the operational settings and the terminal characteristics, the delivered quality of service (UQS'), by instructing, via the network, the associated application terminal to modify the operational settings of the specific application and, when necessary, the characteristic properties of the associated application terminal so as to request a different quality of service from the network in order to minimize the difference; and when appropriate and in response to the difference, also instructs the network control server to modify the technical quality of service to be provided by the channel; and wherein:

the quality-control server further comprises a different corresponding user agent for every one of the users so as to define a plurality of user agents, and the associated application terminal comprises a respective agent-setting application such that operational settings desired by said each user for the corresponding specific application are passed to the corresponding user agent at the quality control server.

2. The control system recited in claim 1 wherein the corresponding user agent for said each user is set by said each user through the associated application terminal and via the network, wherein the corresponding user agent, by reference to preferences of said each user and the characteristic properties of the associated application terminal, determines the technical quality of service that reduces the difference and instructs the network control server, via the network, to so set the technical quality of service of the channel accordingly.

3. The control system recited in claim 2 wherein the associated application terminal passes on parameters, algorithms and variables relating to the delivered quality of service, through the network, to the corresponding user agent in the quality-control server.

4. The control system recited in claim 2 wherein the quality-control server iteratively derives parameters, algorithms and variables relating to the delivered quality of service from behavior and course of values of parameters and variables exchanged between the associated application terminal and the quality-control server.

5. The control system recited in claim 2 wherein the corresponding user agent is set by said each user through a module situated within the associated application terminal and constructed as a plug-in to a terminal application.

6. The control system recited in claim 1 wherein operational settings of the corresponding specific applications residing on the application terminals are passed to the user agents at the quality control server, and wherein a number of variables which collectively serve as a measurement signal reflective of the quality of service delivered to said each user at the associated application terminal is passed on by the associated application terminal to the quality control server.

7. The control system recited in claim 6 wherein the characteristic parameters of each of the application terminals comprise screen settings, transmission rate and IP settings.

8. The control system recited in claim 6 wherein one of the user agents at the quality control server reduces communication costs by determining the operational settings of the corresponding specific application at the associated application terminal so as to require a minimum technical quality of service.

9. The control system recited in claim 6 wherein one of the user agents is instructed by a corresponding one of the users that the technical service of quality is not permitted to be higher than a level corresponding to more than a predefined maximum amount of money per unit of time.

* * * * *

UNITED STATES PATENT AND TRADEMARK OFFICE

CERTIFICATE OF CORRECTION

PATENT NO. : 7,395,350 B1
APPLICATION NO. : 09/958133
DATED : July 1, 2008
INVENTOR(S) : de Caluwe et al.

It is certified that error appears in the above-identified patent and that said Letters Patent is hereby corrected as shown below:

On the title page item (54) and Col. 1, line 1,

Delete "CONTROL SYSTEM FOR AN IC NETWORK" and replace with --CONTROL SYSTEM FOR A COMMUNICATION NETWORK--

Signed and Sealed this

Ninth Day of February, 2010

David J. Kappos
*Director of the United States Patent and Trademark Office*